3,736,314
UNSATURATED NUCLEOSIDE PHOSPHONATES, PHOSPHONIC ACIDS AND PHOSPHONIC ACID SALTS
Gordon H. Jones, Palo Alto, and John G. Moffatt, Los Altos, Calif., assignors to Syntex Corporation, Panama, Republic of Panama
No Drawing. Continuation-in-part of application Ser. No. 709,234, Feb. 29, 1968, which is a continuation-in-part of applications Ser. No. 654,056, July 18, 1967, now abandoned, and Ser. No. 805,792, Mar. 10, 1969, which is a continuation-in-part of application Ser. No. 643,078, June 2, 1967, now Patent No. 3,524,846, which in turn is a continuation-in-part of application Ser. No. 679,218, Oct. 30, 1967, now Patent No. 3,446,793. This application Oct. 20, 1970, Ser. No. 82,555
Int. Cl. C07d 51/52, 51/54
U.S. Cl. 260—211.5 R                    12 Claims

ABSTRACT OF THE DISCLOSURE

The 5',6'-dideoxy-ribo-hex-5'-enofuranosyl nucleoside 6'-phosphonates, 5',6'-dideoxy-arabino-hex-5'-enofuranosyl nucleoside 6'-phosphonates, and 5',6'-dideoxyxylohex-5'-enofuranosyl nucleoside 6'-phosphonates; and the 2'-deoxy, 3'-deoxy and 2',3'-dideoxy counterparts thereof and the corresponding 6'-phosphonic acids, and their pharmaceutically acceptable salts are valuable pharmacological agents and are useful as intermediates for the corresponding saturated nucleoside 6'-phosphonates. For example, they are useful in regulating and controlling metabolism and for producing metabolic deficiencies in biological systems.

---

This is a continuation-in-part of application Ser. No. 709,234 filed Feb. 29, 1968, which is a continuation-in part of application Ser. No. 654,056 filed July 18, 1967 and now abandoned, and of application Ser. No. 805,792, filed Mar. 10, 1969, which is a continuation-in-part of applications Ser. No. 643,078, filed June 2, 1967, and now Pat. No. 3,524,846, Ser. No. 679,218, filed Oct. 30, 1967, and now Pat. No. 3,446,793 and said Ser. No. 709,234 and now Pat. No. 3,662,031.

This invention relates to nucleoside phosphonates, phosphonic acids, and their pharmaceutically acceptable salts and to intermediates therefor. In particular, this invention relates to 5',6'-dideoxy-β-D-ribo-hex-5'-enofuranosyl nucleoside 6'-phosphonates, 5',6'-dideoxy-β-D-arabino-hex-5'-enofuranosyl nucleoside 6'-phosphonates, 5',6'-dideoxy-β-D-xylo-hex-5'-enofuranosyl nucleoside 6'-phosphonates; the 2'-deoxy, 3'-deoxy and 2',3'-dideoxy counterparts thereof, the corresponding monoesters, 6'-phosphonic acids, and their pharmaceutically acceptable salts.

For the purpose of describing this invention, nucleosides as a class are defined to include 1-β-D-glycosyl pyrimidine bases and 9-β-D-glycosyl purine bases and their analogs wherein the glycosyl moiety includes the ribo-, xylo-, and arabino-, pento- and hexo-furanosides and the various deoxy counterparts or derivatives thereof.

The unsaturated nucleoside phosphonates of this invention include the 5',6'-dideoxy-ribo-hex-5'-enofuranosyl nucleoside 6'-phosphonates, that is, 1-[5,6-dideoxy-6-(P,P-disubstitutedphosphinyl)-β-D-ribo-hex-5-enofuranosyl]-pyrimidine bases,
9-[5,6-dideoxy-6-(P,P-disubstitutedphosphinyl)-β-D-ribohex-5-enofuranosyl]-purine bases,
1-[2,5,6-trideoxy-6-(P,P-disubstitutedphosphinyl)-β-D-erythro-hex-5-enofuranosyl]-pyrimidine bases,
9-[2,5,6-trideoxy-6-(P,P-disubstitutedphosphinyl)-β-D-erythro-hex-5-enofuranosyl]-purine bases,
1-[3,5,6-trideoxy-6-(P,P-disubstitutedphosphinyl)-β-D-erythro-hex-5-enofuranosyl]-pyrimidine bases,
9-[3,5,6-trideoxy-6-(P,P-disubstitutedphosphinyl)-β-D-erythro-hex-5-enofuranosyl]-purine bases,
1-[2,3,5,6-tetradeoxy-6-(P,P-disubstitutedphosphinyl)-β-D-glycero-hex-5-enofuranosyl]-pyrimidine bases, and
9-[2,3,5,6-tetradeoxy-6-(P,P-disubstitutedphosphinyl)-β-D-glycero-hex-5-enofuranosyl]-purine bases;

the 5',6'-dideoxy-arabino-hex-5-enofuranosylnucleoside 6'-phosphonates, that is, 1-[5,6-dideoxy-6-(P,P-disubstitutedphosphinyl)-β-D-arabino-hex-5-enofuranosyl]-pyrimidine bases,
9-[5,6-dideoxy-6-(P,P-disubstitutedphosphinyl)-β-D-arabino-hex-5-enofuranosyl]-purine bases; and the 5',6'-dideoxy-xylo-hex-5'-enofuranosylnucleoside 6'-phosphonates, that is, 1-[5,6-dideoxy-6-(P,P-disubstitutedphosphinyl)-β-D-xylo-hex-5-enofuranosyl]-pyrimidine bases,
9-[5,6-dideoxy-6-(P,P-disubstitutedphosphinyl)-β-D-xylo-hex-5-enofuranosyl]-purine bases,
1-[2,5,6-trideoxy-6-(P,P-disubstitutedphosphinyl)-β-D-threo-hex-5-enofuranosyl]-pyrimidine bases, and
9-[2,5,6-trideoxy-6-(P,P-disubstitutedphosphinyl)-β-D-threo-hex-5-enofuranosyl]-purine bases.

Also included are the corresponding 6'-phosphonic acids, monoesters, and the pharmaceutically acceptable salts thereof. These compounds can be represented by the following general formulas:

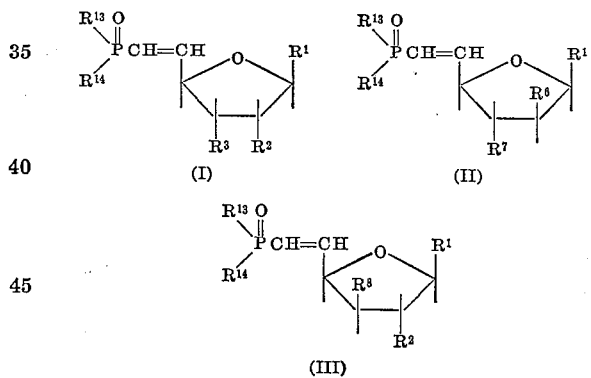

In the above formulas, $R^1$ is a pyrimidine or purine base and the conventional hydrolyzable acyl derivatives thereof;
$R^2$ and $R^3$ each is hydrogen, hydroxy or conventional hydrolyzable esters thereof;
$R^2$ and $R^3$ together are an acetal group such as isopropylidenedioxy, p-anisylidenedioxy, and the like;
$R^6$, $R^7$ and $R^8$ each is hydroxy or conventional hydrolyzable esters thereof;
$R^{13}$ and $R^{14}$ each is —OM, —OR$^9$, —SR$^{10}$,

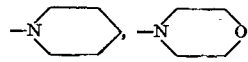

or —NR$^{11}$R$^{12}$ wherein M is hydrogen or a pharmaceutically acceptable cation, each of $R^9$ and $R^{10}$ is lower alkyl, lower alkenylmethyl, aryl having from 6 to 12 carbons, halo, nitro, lower alkoxy, or diloweralkylamino substituted aryl, and each of $R^{11}$ and $R^{12}$ is lower alkyl.

The term "pyrimidine base," as used herein, refers to an unsubstituted or substituted pyrimidine, 5-aza or 6- azapyrimidine group wherein the point of attachment to the ribose unit is through the one position of the pyrimidine group. The term "purine base," as used herein, refers to an unsubstituted or substituted purine, 2-azapurine, 7-deazapurine or 8-azapurine group wherein the point of attachment to the ribose unit is through the nine position of the purine group. Thus, the term "pyrimidine or purine base" is inclusive of the nitrogen analogs, i.e. members of the 5-azapyrimidine, 6-azapyrimidine, 7-deazapurine, 2-azapurine, 8-aza-9-deazapurine and 8-azapurine series.

More specifically, the terms pyrimidine and purine bases include the following representative bases:

When the compounds of this invention are derived from ribofuranosides, the pyrimidine and purine bases include uracil-1-yl, cytosin-1-yl, 5-bromouracil-1-yl, 5-bromocytosin-1-yl, 5-chlorouracil-1-yl, 5-chlorocytosin-1-yl, 5-iodouracil-1-yl, 5-iodocytosin-1-yl, 5-fluorouracil-1-yl, 5-fluorocytosin-1-yl, thymin-1-yl, 5 - methylcytosin-1-yl, 5-trifluoromethyluracil-1-yl, 5-trifluoromethylcytosin-1-yl, 5-aminouracil-1-yl, 5-aminocytosin-1-yl, 5-methylaminouracil-1-yl, 5-methylaminocytosin-1-yl, 5-hydroxyuracil-1-yl, 5-azacytosin-1-yl, 6-azauracil-1-yl, 6 - azacytosin-1-yl, 6-azathymin-1-yl, hypoxanthin-9-yl, 2-azaadenin-9-yl, 7-deazaadenin-9-yl, 7-deazaguanin-9-yl, adenin-9-yl, 6-dimethylaminopurin-9-yl, 6-chloropurin-9-yl, 6-mercaptopurin-9-yl, 6-methylmercaptopurin-9-yl, quanin-9-yl, xanthin-9-yl, 2,6-dichloropurin-9-yl, 2,6-dimethylaminopurin-9-yl, 2,6-diaminopurin-9-yl, 8-azaadenin-9-yl, thioguanin - 9 - yl, 2-fluoroadenin-9-yl, 6-hydroxylaminopurin-9-yl, 8-aza-9-deazaadenin-9-yl, and 8-azaguanin-9-yl.

When the compounds of the invention are derived from xylofuranosides, the pyrimidine and purine bases include uracil-1-yl, cytosin-1-yl, 5-bromouracil-1-yl, 5-bromocytosin-1-yl, 5-chlorouracil-1-yl, 5-chlorocytosin - 1 - yl, 5-iodouracil-1-yl, 5-iodocytosin-1-yl, 5-fluorouracil-1-yl, 5-fluorocytosin-1-yl, thymin - 1 - yl, 5-methylcytosin-1-yl, 5-aminouracil-1-yl, 5-aminocytosin-1-yl, 5-methylaminouracil-1-yl, 5-methylaminocytosin-1-yl, 5-hydroxyuracil-1-yl, hypoxanthin-9-yl, adenin-9-yl, 6-dimethylaminopurin-9-yl, 6-chloropurin-9-yl, 6-mercaptopurin-9-yl, 6-methylmercaptopurin-9-yl, guanin-9-yl, 2,6 - dichloropurin-9-yl, 2,6-dimethylaminopurin-9-yl, 2,6-diaminopurin-9-yl, thioguanin-9-yl and 6-hydroxylaminopurin-9-yl.

When the compounds of this invention are derived from arabinofuranosides, the pyrimidine and purine bases include uracil-1-yl, cytosin-1-yl, 5-bromouracil-1yl, 5-bromocytosin-1-yl, 5-chlorouracil-1-yl, 5-chlorocytosin - 1 - yl, 5-iodouracil-1-yl, 5-iodocytosin-1-yl, 5-fluorouracil-1-yl, 5-fluorocytosin-1-yl, thymin-1-yl, 5 - methylcytosin - 1 - yl, 5-trifluoromethyluracil-1-yl, 5-trifluoromethylcytosin-1-yl, 5-aminouracil-1-yl, 5-aminocytosin-1-yl, 5-methylaminouracil-1-yl, 5-methylaminocytosin-1-yl, 5-hydroxyuracil-1-yl, 6-azauracil-1-yl, 6-azacytosin-1-yl, hypoxanthin-9-yl, adenin-9-yl, 6-dimethylaminopurin-9-yl, 6-chloropurin-9-yl, 6-mercaptopurin-9-yl, 6-methylmercaptopurin - 9 - yl, guanin-9-yl, thioguanin-9-yl and 6-hydroxylaminopurin-9-yl.

When the compounds of this invention are derived from 2'-deoxyribofuranosides, the pyrimidine and purine bases include uracil-1-yl, cytosin-1-yl, 5-bromouracil-1-yl, 5-bromocytosin-1-yl, 5-chlorouracil-1-yl, 5-chlorocytosin-1-yl, 5-iodouracil-1-yl, 5-iodocytosin-1-yl, 5-fluorouracil-1-yl, 5-fluorocytosin-1-yl, thymin-1-yl, 5-trifluoromethyluracil-1-yl, 5-trifluoromethylcytosin-1-yl, 5-aminouracil - 1 - yl, 5-aminocytosin-1-yl, 5-methylaminouracil-1-yl, 5-methylaminocytosin-1-yl, 5-hydroxyuracil-1-yl, 6-azauracil-1-yl, 6-azacytosin-1-yl, 6-azathymin-1-yl, hypoxanthin-9-yl, adenin - 9 - yl, 6-dimethylaminopurin-9-yl, 6-chloropurin-9-yl, 6 - mercaptopurin - 9 - yl, 6-methylmercaptopurin-9-yl, guanin - 9 - yl, xanthin-9-yl, 2,6-dichloropurin-9-yl, 2,6-dimethylaminopurin-9-yl, 2,6 - diaminopurin - 9 - yl, 8-azaadenin-9-yl, thioguanin-9-yl and 6 - hydroxylaminopurin-9-yl.

When the compounds of this invention are derived from 2'-deoxyxylofuranosides, the pyramidine and purine bases include uracil-1-yl, cytosin-1-yl, 5-bromouracil-1-yl, 5-bromocytosin - 1 - yl, 5-chlorouracil-1-yl, 5-chlorocytosin-1-yl, 5-iodouracil-1-yl, 5-iodocytosin-1-yl, thymin - 1 - yl, 5-aminouracil-1-yl, 5-aminocytosin-1-yl, 5 - methylaminouracil-1-yl, 5 - methylaminocytosin - 1 - yl, 5-hydroxyuracil-1-yl, adenin-9-yl, and 6-dimethylaminopurin-9-yl.

When the compounds of this invention are derived from 3'-deoxyribofuranosides, the pyrimidine and purine bases include uracil-1-yl , cytosin - 1 - yl, 5 - bromouracil-1-yl, 5-bromocytosin-1-yl, 5 - chlorouracil - 1 - yl, 5-chlorocytosin-1-yl, 5 - iodouracil-1-yl, 5-iodocytosin - 1 - yl, 5-fluorouracil-1-yl, 5-fluorocytosin - 1 yl, thymin - 1 - yl, 5 - methylcytosin - 1 - yl, 5-aminouracil-1-yl, 5-aminocytosin-1-yl, 5 - methylaminouracil - 1 - yl, 5-methylaminocytosin - 1 - yl, 5-hydroxyuracil-1-yl, 6-azauracil-1-yl, hypoxanthin-9-yl, adenin-9-yl, 6 - dimethylaminopurin-9-yl, 6-chloropurin-9-yl, 6 - mercaptopurin - 9 - yl, 6-methylmercaptopurin-9-yl, guanin - 9 - yl, xanthin-9-yl, 2,6-dichloropurin-9-yl, 2,6-dimethylaminopurin-9-yl, 2,6-diaminopurin-9-yl, 8-azaguanin-9-yl, and 6-hydroxylaminopurin-9-yl.

When the compounds of this invention are derived from 2',3'-dideoxyribofuranosides, the pyrimidine and purine bases include uracil-1-yl, cytosin-1-yl, 5-bromouracil-1-yl, 5-bromocytosin - 1 - yl, 5 - chlorouracil - 1 yl, 5-chlorocytosin-1-yl, 5-iodouracil-1-yl, 5-iodocytosin-1-yl, 5-fluorouracil - 1 - yl, thymin-1-yl, 5-aminouracil-1-yl, 5-aminocytosin-1-yl, 5-methylaminouracil - 1 - yl, 5-methylaminocytosin-1-yl, 5-hydroxyuracil-1-yl, and adenin-9-yl.

The term "pharmaceutically acceptable cations," as used herein, refers to cations of those pharmaceutically acceptable salts conventionally employed in the nucleotide and nucleoside art such as the barium, calcium, sodium, potassium, ammonium, trimethylammonium and triethylammonium salts.

The terms "hydroylzable esters" and "hydrolyzable acyl derivatives," as used herein, refer to those esters and acyl derivatives conventionally employed in the nucleoside and nucleotide art, preferably those derived from carboxylic acids of 1 to 12 carbon atoms. Typical conventional hydrolyzable acyl groups thus include acetyl, propionyl, butyryl, valeryl, isovaleryl, hexanoyl, heptanoyl, octanoyl, nonaoyl, undecanoyl, lauroyl, bezoyl, phenylacetyl, phenylpropionyl, o-, m-, p-toluoyl, β- cyclopentylpropionyl, adamantoyl and the like.

The term "lower alkyl" means a straight or branched chain hydrocarbon group containing from 1 to 6 carbon atoms, inclusive, such as methyl, ethyl, n-propyl, i-butyl, t-butyl, and the like. The term "lower alkenylmethyl" means an alkyl group containing one carbon-carbon double bond at other than the alpha position such as allyl and the like. The term "aryl" means a hydrocarbon group consisting of one or more aromatic rings and containing from 6 to 12 carbon atoms, inclusive, such as phenyl, benzyl, o-tolyl, m-tolyl, p-tolyl, 3,5-xylyl, pentamethylphenyl, naphthyl, and the like. The term "substituted aryl" means an aryl group having one or more halo, nitro, alkoxy, or dialkylamino (o-, m-, and p-) substitutents in the aromatic ring such as p-chlorobenzyl, p-bromobenzyl, 2,4,6-trichlorophenyl- p-nitrophenyl, p-nitrobenzyl, p-anisyl, p-methoxybenzyl, p-dimethylaminophenyl, and the like.

The compounds of this invention are useful for preparing nucleoside phosphonates disclosed in application Ser. No. 805,792 filed Mar. 10, 1969 which are useful as regulators of metabolic processes. The compounds of this invention are useful in regulating and controlling metabolism and for producing metabolic deficiencies in biological systems. These compounds can be used as intermediates for making phosphonate analogs of known nucleoside and nucleotide co-enzymes.

The compounds of this invention are prepared by a procedure which can be represented as follows, the process being illustrated for 5',6'-dideoxy-ribo-hex-5'-enofuranosyl nucleoside 6'-phosphonates only by way of representative example:

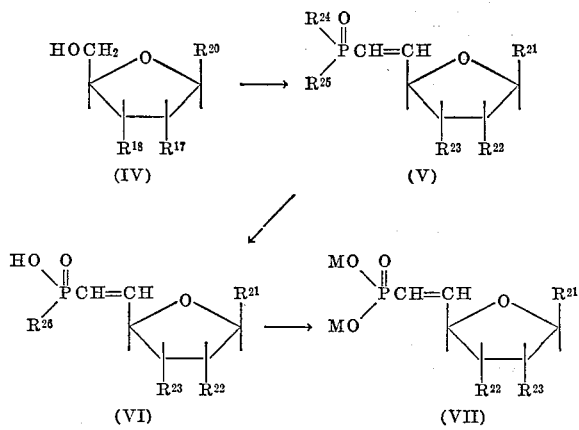

In the above formulas, each of $R^{17}$ and $R^{18}$ is a conventional hydrolyzable hydroxy ester or $R^{17}$ and $R^{18}$ together are an acetal group such as isopropylidenedioxy or p-anisylidenedioxy;

$R^{20}$ is uracil-1-yl, cytosin-1-yl, 5-bromouracil-1-yl, 5-bromocytosin-1-yl, 5-chlorouracil-1-yl, 5-chlorocytosin-1-yl, 5-iodouracil-1-yl, 5-iodocytosin-1-yl, 5-fluorouracil-1-yl, 5-fluorocytosin-1-yl, thymin-1-yl, 5-methylcytosin-1-yl, 5-trifluoromethyluracil-1-yl, 5-trifluoromethylcytosin-1-yl, 5-aminouracil-1-yl, 5-aminocytosin-1-yl, 5-methylaminouracil-1-yl, 5-methylaminocytosin-1-yl, 5-azacytosin-1-yl, 6-azauracil-1-yl, 6-azacytosin-1-yl, 6-azathymin-1-yl, hypoxanthin-9-yl, 2-azaadenin-9-yl, 7-deazaadenin-9-yl, 7-deazaguanin-9-yl, adenin-9-yl, 6-dimethylaminopurin-9-yl, 6-chloropurin-9-yl, guanin-9-yl, xanthin-9-yl, 2,6-dichloropurin-9-yl, 2,6-dimethylaminopurin-9-yl, 2,6-diaminopurin - 9 - yl, 8-azaadenin-9-yl, thioguanin-9-yl, 2-fluoroadenin - 9 - yl, 8-aza-9-deazaadenin-9-yl, 8-azaguanin-9-yl, and acyl derivatives thereof;

$R^{21}$ represents the groups of $R^{20}$ and also 6-mercaptopurin-9-yl and 6-methylmercaptopurin-9-yl;

$R^{22}$ and $R^{23}$ each is hydroxy or a conventional hydrolyzable hydroxy ester or $R^{22}$ and $R^{23}$ together are an acetal group such as isopropylidenedioxy, p-anisylidenedioxy;

$R^{24}$ and $R^{25}$ each is —$OR^9$, —$SR^{10}$, morpholino, piperidino, or —$NR^{11}R^{12}$ wherein each of $R^9$ and $R^{10}$ is lower alkyl, lower alkenylmethyl, aryl or substituted aryl, and each of $R^{11}$ and $R^{12}$ is lower alkyl;

$R^{26}$ is the same as $R^{24}$ but not including morpholino, piperidino or —$NR^{11}R^{12}$;

$R^2$, $R^3$ and M are as previously defined.

The nucleosides of Formula IV are known in the art or can be prepared from compounds known in the art by conventional procedures.

In the above reaction sequence, the nucleosides of Formula IV are first oxidized to the corresponding 5'-aldehydo compounds by reaction with a dialkylcarbodiimide such as dicyclohexylcarbodiimide in dimethyl sulfoxide in the presence of a proton source, preferably pyridinium trifluoroacetate, pyridinium phosphate dichloroacetic acid or pyridine hydrochloride as described in U.S. Pat. 3,248,380.

The aldehydo compound is then reacted with a phosphonium ylid which can be represented by the following general formula

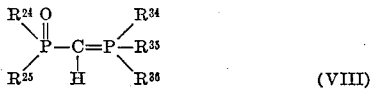

wherein $R^{24}$ and $R^{25}$ are as defined above and $R^{34}$, $R^{35}$ and $R^{36}$ each is lower alkyl, aryl or substituted aryl or $R^{34}$, $R^{35}$ and $R^{36}$ together are all N-piperidyl, N-morpholinyl, dimethylamino or cyclohexyl.

In this reaction, the phosphorylated phosphonium ylid of Formula VIII is allowed to react with the aldehydo compounds, in an inert organic solvent such as tetrahydrofuran, dioxane, dimethylformamide, dimethyl sulfoxide, hexamethylphosphoramide, acetonitrile, or mixtures thereof, and the like, at a temperature of from 25° C. to the reflux temperature of the solvent (preferably at about 25° C.) for a period of from 1 to 48 hours to form the corresponding 5'6'-dideoxy-ribo-hex-5'-enofuranosyl nucleosides 6'-phosphonates of Formula V.

When $R^{21}$ of the compounds of Formula VI is a 6-chloropurin-9-yl group, the compounds can be reacted with thiourea in absolute alcohol at reflux to yield the corresponding 6-mercaptopurine compounds. Reacting the 6-chloropurine compounds of Formula V with thiourea in absolute alcohol at reflux for about 1 hour, mixing the reaction product with methyl iodide, and maintaining the mixture at room temperature for four hours with dilute methanolic sodium hydroxide addition to maintain an alkaline pH yields the corresponding 6-methylmercaptopurine compounds.

In the above reaction with the ylid, the products formed have both the trans and cis configuration at the 5' and 6' positions, the trans product being the major product. The trans product can be separated from the mixture by conventional crystallization.

Monodealkylation of the compounds of Formula V when $R^{24}$ and $R^{25}$ are other than morpholino, piperidino, and —$NR^{11}R^{12}$ can be achieved by alkaline hydrolysis at room temperature in a solution of a strong alkali metal hydroxide such as lithium hydroxide or sodium hydroxide in aqueous ethanol, dioxane, dimethyl sulfoxide, tetrahydrofuran, acetonitrile, and the like for about 30 minutes to 2 hours or longer. When $R^{24}$ and $R^{25}$ are lower alkoxy, benzyloxy or substituted benzyloxy, monodealkylation can be obtained by conventional treatment with sodium iodide in dimethylformamide at 100° C. for 2 hours followed by evaporating the solvent, adding acetone, filtering the precipitated sodium salt of the monoester from the mixture, and washing the precipitate with acetone. In the monodealkylation step with base, the acyloxy groups of $R^{22}$ and $R^{23}$ are removed.

The second —$OR^9$ group can be removed by enzymatic action by incubation in the presence of a snake venom phosphodiesterase such as that present in the venom of Crotaleus adamanteus and the like. When $R^{27}$ is —$SR^{10}$, the second group can be removed by treatment with an aqueous acetone solution containing an excess of iodine as described by A. L. Nussbaum et al., J. Am. Chem. Soc., 87, 2513–4 (1965) to yield the corresponding phosphonic acid.

Where each of $R^{24}$ and $R^{25}$ represents morpholino, piperidino, or —$NR^{11}R^{12}$, the groups are removed by aqueous hydrolysis with a cation-exchange resin in the acid form, with an aqueous inorganic acid such as aqueous hydrochloric acid, or an organic acid such as 50–80% acetic acid, to form the phosphonic acid compounds of Formula VII.

The acetal groups of the compounds of Formula VII can be removed by acid hydrolysis, for example by either passing the compound through a column of cation-exchange resin in the acid form and heating the resulting solution or by treatment with acetic acid at 100° C. or with formic acid and trifluoroacetic acid at room temperature for 1 to 3 hours to yield the free hydroxy compounds. When $R^2$ and/or $R^3$ are O-acyl groups and when $R^{21}$ has N-acyl groups, the acyl groups can be hydrolyzed by treatment with an alcoholic solution of an organic amine or preferably an ethanol solution of ammonium hydroxide at room temperature for about 6 hours.

When M in the compounds of Formula VII are desired to be pharmaceutically acceptable cations, the corresponding free phosphonic acid may be neutralized with the appropriate base, or another salt of the phosphonic acid can be treated with a cation exchange resin preloaded with the pharmaceutically acceptable cation desired, cation exchange in the column producing the desired product. This is a routine and conventional procedure. The free phosphonic acid can correspondingly be obtained by ion exchange of the phosphonic acid salt with a cation exchange in the acid form by conventional procedures. Alternatively, an appropriate salt may be treated with an equivalent of inorganic acid such that the phosphonic acid or the resulting inorganic salt is insoluble, thereby facilitating separation of the phosphonic acid. For example, adding an equivalent of sulfuric acid to an aqueous solution of a barium salt of the compounds of Formula VII yields the free acid and a precipitate of the barium sulfate.

The 5',6' - dideoxy - arabino - hexo - 5' - enofuranosyl nucleosides 6' - phosphonates, 6' - phosphonic acids and their pharmaceutically acceptable salts of Formula II and the 5',6'-dideoxy-xylo-hex - 5' - enofuranosyl nucleoside 6' - phosphonates, 6' - phosphonic acids and their pharmaceutically acceptable salts of Formula III can be prepared from known nucleosides or nucleosides available by known, conventional procedures from known nucleosides, by the above-illustrated procedure except that acyl groups are used to protect any 2' or 3' - hydroxy group. Special care must be taken in producing the 5',6'-dideoxy-β-D-xylo-hex - 5' - enofuranosyl nucleoside 6' - phosphonates, 6'-phosphonic acids and their pharmaceutically acceptable salts, however, to prevent the formation of cyclic esters between the 3'-hydroxy group and the phosphonic acid group.

The 5',6' - dideoxy-β-D-ribo-hex - 5' - enofuranosyl nucleoside 6'-phosphonic acids, 5'-6' - dideoxy - β - D-arabino-hex - 5' - enofuranosyl nucleoside 6'-phosphonic acids, and 5',6'-dideoxy-β-D-xylo-hex-5'-enofuranosyl nucleoside 6'-phosphonic acids of Formulas I, II and III can be further treated by the following procedures to effect substitution of the purine or pyrimidine bases.

Compounds of Formulas I, II and III containing 5-aminocytosine, 5-methylaminocytosine, 5-aminouracil and 5-methylaminouracil groups can be obtained by reacting the respective compounds containing 5-bromocytosine or 5-bromouracil groups with ammonia or methylamine, respectively, at from 60 to 100° C. for from 4 to 24 hours under pressure followed by purification of the product residue by conventional ion exchange chromatography to yield the corresponding compounds. In a similar manner, compounds of Formulas I, II, and III having 2,6-dichloropurine groups can be reacted with ammonia under the above conditions to yield the corresponding 2,6-diaminopurine containing compounds. Also, the compounds of Formulas I, II, and III, containing 6-chloropurine groups can be reacted with dimethylamine under the above conditions, replacing ammonia with dimethylamine, to yield the corresponding 6-dimethylaminopurine compounds.

5-hydroxyuracil compounds of Formulas I, II, and III can be prepared by hydrolyzing the corresponding 5-bromouracil compounds with sodium bicarbonate at about 100° C. under an inert gas such as nitrogen for from about 4 to 24 hours. Alternatively, an aqueous solution of the disodium salt of uracil compounds of Formulas I, II and III can be brominated with saturated bromine water at room temperature to form the 5-bromo compound, and the reaction mixture can then be mixed with pyridine and maintained at about 100° C. for from 4 to 8 hours to form the 5-hydroxyuracil containing compounds.

6-mercaptopurine compounds of Formulas I, II and III can be prepared by reacting the corresponding 6-chloropurine compounds with thiourea in absolute ethanol at reflux for about 1 hour and evaporating the reaction mixture to dryness. The residue is purified by ion exchange chromatography when $R^4$ and/or $R^5$ is —OM and by silicic acid chromatography with the other compounds to yield the respective 6-mercaptopurine compounds of Formulas I, II and III.

6-methylmercaptopurine compounds of Formulas I, II and III can be prepared by taking the reaction product of the above reaction with thiourea and mixing it with methyl iodide. The mixture is maintained at room temperature for about 4 hours while a dilute methanolic sodium hydroxide is added to maintain a pH of about 8. At least some loss of ester groups can be expected during this step. The reaction mixture is then evaporated to dryness, the residue is treated with concentrated ammonium hydroxide, etc. to remove acyl functions or with acid to remove acetal groups as described above to yield the respective 6-methyl-mercaptopurine compound of Formulas I, II and III.

Th novel phosphorylated phosphonium ylids of Formula VIII have been previously disclosed together with procedures for their preparation in U.S. application Ser. No. 709,234, filed Feb. 29, 1968. In general these compounds are prepared according to the following reaction:

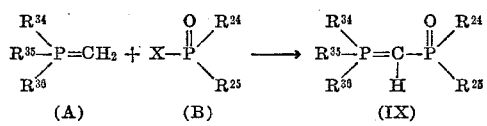

wherein X is chloro or bromo; and all other substituents are as defined hereinabove with respect to Formula VIII.

In the practice of the above sequence, a phosphonium ylid (A) is condensed under substantially anhydrous conditions with an appropriately disubstituted phosphoryl halide (B) in a nonreactive organic solvent such as tetrahydrofuran, dioxane, benzene, diethyl ether, hexane, and the like, and mixtures thereof, at a temperature of about 0° C. to the reflux temperature of the solvent, for a period of about ½ to about 12 hours.

Although the molar proportion of the phosphonium ylid (A) to the disubstituted phosphoryl halide (B) is not critical, a preferred embodiment of two moles of the phosphonium ylid per mole of the disubstituted phosphoryl halide (B) is convenient.

In the practice of the above sequence, the reaction should be carried out in the presence of an inert atmosphere such as a nitrogen atmosphere, an argon atmosphere, and the like. In addition, the phosphonium ylid (A) is generated in situ by conventional techniques known to those skilled in the art.

When $R^{24}$ and $R^{25}$ are alkyloxy or substituted alkyloxy such as benzyl, methyl, ethyl and the like, the phosphonium ylids can be obtained by transesterification of the corresponding phosphonium ylids wherein $R^{24}$ and $R^{25}$ is phenyloxy. The transesterification is obtained with the appropriate alcohol at temperatures of from 20 to 80° C. for from 15 minutes to 48 hours.

This invention is further illustrated by the following specific but non-limiting examples.

EXAMPLE 1

Diphenyl tri-n-butylphosphoranylidenemethylphosphonate

A solution of 84.6 g. (0.3 mole) of diphenyl chloromethylphosphonate and 60.6 g. (0.3 mole) of tri-n-butylphosphine in 250 ml. of xylene is heated under reflux in a dry argon atmosphere for 24 hours. The reaction mixture is then cooled in ice-water and on seeding, deposits white crystals. These are collected by filtration and washed with benzene, ether and air dried to yield tri - n- butyl-(diphenoxyphosphinylmethyl)-phosphonium chloride.

A solution of 485 mg. (1.0 mmole) of this compound in 10 ml. of water is treated with 2 N aqueous sodium hydroxide solution until the pH of the solution is about 8. The white precipitate which forms is removed by filtration, washed with water and dried to yield diphenyl tri-n-butylphosphoranylidenemethylphosphonate.

This compound is fairly unstable and should be used immediately. Preferably, it is prepared in situ.

EXAMPLE 2

Dimethyl tri-n-butylphosphoranylidenemethylphosphonate

A solution of 535 mg. of tri-n-butyl-(diphenoxyphosphinylmethyl)-phosphonium chloride and 125 mg. of potassium-t-butoxide in 10 ml. of dry methanol is allowed to stand at room temperature for 10 minutes. Quantitative gas-liquid chromatographic examination of the reaction mixture is used to determine when the transesterification is complete as determined by the amount of phenol liberated. The resulting solution containing the dimethyl tri-n-butylphosphoranylidenemethylphosphonate is used directly.

EXAMPLE 3

2',3'-O-isopropylidene nucleosides

A suspension of 1 mmole of 1-$\beta$-D-ribofuranosyluracil in 15 ml. of anhydrous acetone is treated with 1.5 ml. of 2,2-dimethoxypropane followed by 300 mg. of di-p-nitrophenyl hydrogen phosphate. The mixture is magnetically stirred at room temperature in a tightly stoppered flask until solution is complete (1 to 2 hours) and then maintained at room temperature for a further period of from 3 to 5 hours. Triethylamine is then added to neutralize the excess acid, and the reaction mixture is evaporated to dryness to yield 1-(2,3-O-isopropylidene-$\beta$-D-ribofuranosyl)-uracil which can be further purified by direct crystallization or by column or thin layer chromatography on silica gel.

Repeating this procedure with other 1-$\beta$-D-ribofuranosyl-pyrimidine bases and 9-$\beta$-D-ribofuranosyl-purine bases yields the corresponding compounds containing 2,3-O-isopropylidene groups wherein the pyrimidine and purine bases include cytosine, 5-bromouracil, 5-bromocytosine, 5-chlorouracil, 5-chlorocytosine, 5-iodouracil, 5-iodocytosine, 5-fluorouracil, 5-fluorocytosine, thymine, 5-methylcytosine, 5-trifluoromethyluracil, 5-trifluoromethylcytosine, 5-aminouracil, 5-aminocytosine, 5-methylaminouracil, 5-methylaminocytosine, 6-azauracil, 5-azacytosine, 6-azacytosine, hypoxanthine, 2-azaadenine, 7-deazaadenine, 7-deazaguanine, adenine, dimethylaminopurine, 6-chloropurine, guanine, xanthine, 2,6-dichloropurine, 2,6-dimethylaminopurine, 2,6-diaminopurine, 8-aza-9-deazaadenine, 8-azaadenine, thioguanine, 2-fluoroadenine, and 8-azaguanine.

EXAMPLE 4

O-benzoyl compounds 2.67 grams of 9-$\beta$-D-xylofuranosyladenine is dissolved in 75 ml. of anhydrous pyridine and treated with 3.0 g. of 4-monomethoxytrityl chloride at room temperature for 2 hours. The reaction mixture is poured into excess ice water, with vigorous stirring, and the aqueous mixture is then extracted with ethyl acetate (3×100 ml.). The combined ethyl acetate extracts are dried over magnesium sulfate and evaporated to dryness to yield crude 9-[5-O-(4-monomethoxytrityl)-$\beta$ - D - xylofuranosyl] - adenine which can be further purified by column chromatography on silica gel. This compound (2.5 g.) is then dissolved in 20 ml. of anhydrous pyridine and treated with 3 ml. of benzoyl chloride. The tightly stoppered mixture is kept in the dark at room temperature for 6 hours and then poured into 500 ml. of ice water with vigorous stirring. The water mixture is extracted with chloroform (3×200 ml.), the combined extracts are dried over magnesium sulfate and evaporated to dryness to yield 9-[2,3-di-O-benzoyl - 5 - (4-monomethoxytrityl)-$\beta$-D-xylfuranosyl]-$N^6$-benzoyl adenine together with some tetrabenzoyl compound. The latter mixture is not further purified but is immediately dissolved in 50 ml. of 80% acetic acid, and the solution is set aside at room temperature for 5 hours, after which time the reaction mixture is evaporated to dryness and the residue is applied to a silica gel column as a chloroform solution. Elution of the column with a gradient of chloroform to 15% methanol in chloroform gives, after pooling and evaporation of the appropriate fractions, 9 - (2,3-di-O-benzoyl-$\beta$-D-xylofuranosyl)-$N^6$-benzoyl adenine.

Repeating this procedure with 1-$\beta$-D-xylofuranosyl-pyrimidine bases and other 9-$\beta$-D-xylofuranosyl purine bases, 1-$\beta$-D-arabinofuranosyl-pyrimidine bases, 9-$\beta$-D-arabinofuranosyl-purine, bases, 1 - (2-deoxy - $\beta$-D-ribofuranosyl)-pyrimidine bases, 9 - (2 - deoxy - $\beta$-D-ribofuranosyl)-purine bases, 1 - (2-deoxy-$\beta$-D-xylofuranosyl-pyrimidine base, 9 - (2 - deoxy-$\beta$-D-xylofuranosyl)-purine bases, 5 - hydroxy - 1 - $\beta$ - D-ribofuranosyluracil, 1-(3-deoxy-$\beta$-D-ribofuranosyl)-pyrimidine bases and 9-(3-deoxy-$\beta$-D-ribofuranosyl)-purine bases and using sufficient benzoyl chloride to acylate the reactive groups yields the corresponding compounds containing O-benzoyl and N-benzoyl protecting groups.

EXAMPLE 5

1-(5,6-dideoxy-2,3-O-isopropylidene-6-diphenoxyphosphinyl-$\beta$-D-ribo-hex-5-enofuranosyl)-pyrimidine bases To a solution of 10 mmoles of 1-(2,3-O-isopropylidene-$\beta$-D-ribofuranosyl)-uracil in 25 ml. of anhydrous dimethyl sulfoxide are added 6.2 g. (30 mmoles) of dicyclohexylcarbodiimide, 0.2 ml. (10 mmoles) of pyridine and 0.4 ml. (5 mmoles) of trifluoroacetic acid. The resulting solution is allowed to stand at 25° C. for 6 hours, during which time dicyclohexylurea precipitates from the solution. At the end of the reaction, dicyclohexylurea is removed by filtration and washed with several portions of fresh, anhydrous dimethyl sulfoxide, the combined filtrate and washings thus containing 1-(2,3-O-isopropylidene-$\beta$-D-ribo-pentodialdo-1,4-furanosyl)-uracil.

To the combined filtrate and washings is added 5.08 g. (10 mmoles) of diphenyl triphenylphosphoranylidenemethylphosphonate, and the resulting mixture is allowed to stand at 37° C. for 16 hours. At this point, 200 ml. of ethyl acetate is added, and the organic phase is washed with three 100 ml. portions of water, dried and filtered, and evaporated under reduced pressure to yield a pale yellow oil. A solution of this oil in chloroform is chromatographed on eight 1 m. x 20 cm. glass plates coated with a 1.3 mm. layer of silicic acid. Development with ethyl acetate gave two main ultraviolet absorbing bands. Elution of one band gave triphenylphosphine oxide. Elution of the other band yielded a mixture of the trans and a small amount of the cis isomer of 1-(5,6-dideoxy-6-diphenoxyphosphinyl-2,3-O-isopropylidene - $\beta$ - D-ribo-hex-5-enofuranosyl-uracil. The pure trans isomer can be obtained by crystallization from ethyl acetate:hexane mixtures.

Repeating the above procedure with other 1-(2,3-O-isopropylidene-$\beta$-D-ribofuranosyl)-pyrimidine bases yields the corresponding trans and cis 1-(5,6-dideoxy-2,3-O-isopropylidene-6-diphenoxyphosphinyl - $\beta$ - D - ribo-hex-5-enofuranosyl)-pyrimidine bases wherein the pyrimidine bases include cytosine, 5-bromouracil, 5-bromocytosine, 5-chlorouracil, 5-chlorocytosine, 5-iodouracil, 5-iodocytosine, 5-fluorouracil, 5-fluorocytosine, thymine, 5-methylcytosine, 5-trifluoromethyluracil, 5-trifluoromethylcytosine, 5 - aminouracil, 5 - aminocytosine, 5 - methylaminouracil, 5-methylaminocytosine, 6-azauracil, 6-azacytosine, and 6-azathymine.

EXAMPLE 6

9-(5,6-dideoxy-2,3-O-isopropylidene-6-diphenoxyphosphinyl-$\beta$-D-ribo-hex-5-enofuranosyl)-purine base Repeating the procedure of Example 5 but replacing the 1 - (2,3 - O-isopropylidine-$\beta$-D-ribofuranosyl)-pyrimidine bases with 9-(2,3-O-isopropylidene-$\beta$-D-ribofuranosyl)-purine bases yields the corresponding trans and cis 9-(5,6-dideoxy - 2,3 - O-isopropylidene-6-diphenoxyphosphinyl- β-D-ribo-hex-5-enofuranosyl)-purine bases wherein the purine bases include hypoxanthine, 7-deazaadenine, 7-deazaguanine, adenine, 6-dimethylaminopurine, 6-chloropurine, guanine, xanthine, 2,6-dichloropurine, 2,6-dimethylaminopurine, 2,6-diaminopurine, 8-azaadenine, thioguanine, 2-fluoroadenine, 8-aza-9-deazaadenine and 8-azaguanine.

EXAMPLE 7

1-(2,3-di-O-benzoyl-5,6-dideoxy-6-diphenoxyphosphinyl-β-D-ribo-hex-5-enofuranosyl)-5-benzoyloxyuracil Repeating the procedure of Example 5 with 1-(2,3-di-O-benzoyl - 5-deoxy-β-D-ribofuranosyl)-5-benzoyloxyuracil yields trans and cis 1-(2,3-di-O-benzoyl-5,6-dideoxy-6-diphenoxyphosphinyl - β - D-ribo-hex-5-enofuranosyl)-5-benzoyloxyuracil.

EXAMPLE 8

1 - (2,3 - di - O - benzoyl-5,6-dideoxy-6-diphenoxyphosphinyl - β-D-xylo-hex-5-enofuranosyl)-pyrimidine bases and 9 - (2,3 - di-O-benzoyl-5,6-dideoxy-6-diphenoxyphosphinyl-β-D-xylo-hex-5-enofuranosyl)-prine bases Repeating the procedure of Example 5 with 1-(1,3-di-O-benzoyl-β-D-xylofuranosyl)-pyrimidine bases and 9-(2,3-di-O-benzoyl-β-D-xylofuranosyl)-purine bases yields the corresponding trans and cis 1-(2,3-di-O-benzoyl-5,6-dideoxy - 6 - diphenoxyphosphinyl - β-D-xylo-hex-5-enofuranosyl)-pyrimidine bases and 9-(2,3-di-O-benzoyl-5,6-dideoxy - 6 - diphenoxyphosphinyl-β-D-xylo-hex-5-enofuranosyl)-purine bases wherein the pyrimidine and purine bases include uracil, $N^4$-benzoylcytosine, 5-fluorouracil, $N^4$ - benzoyl - 5-fluorocytosine, thymine, $N^4$-benzoyl - 5 - methylcytosine, hypoxanthine, $N^6$-benzoyladenine, 6-dimethylaminopurine, 6-chloropurine, $N^2$-benzoylguanine, xanthine, 2,6-dichloropurine and $N^2$-benzoylthioguanine.

EXAMPLE 9

1 - (2,3-di-O-benzoyl-5,6-dideoxy-6-diphenoxyphosphinyl-β-D-arabino-hex-5-enofuranosyl)-pyrimidine bases and 9 - (2,3-di-O-benzoyl-5,6-dideoxy-6-diphenoxyphosphinyl-β-D-arabino-hex-5-enofuranosyl)-purine bases Repeating the procedure of Example 5 with 1-(2,3-di-O-benzoyl-β-D-arabinofuranosyl)-pyrimidine bases and 9-(2,3-di-O-benzoyl-β-D-arabinofuranosyl)-purine bases yields the corresponding 1-(2,3-di-O-benzoyl-5,6-dideoxy-6-diphenoxyphosphinyl-β-D-arabino-hex - 5 - enofuranosyl)-pyrimidine bases and 9-(2,3-di-O-benzoyl-5,6-dideoxy - 6-diphenoxyphosphinyl-β-D-arabino-hex-5-enofuranosyl)-purine bases wherein the pyrimidine and purine bases include uracil, $N^4$-benzoylcytosine, 5-fluorouracil, $N^4$-benzoyl-5-fluorocytosine, thymine, $N^4$-benzoyl-5-methylcytosine, 5-trifluoromethyluracil, $N^4$-benzoyl-5-trifluoromethylcytosine, 6-azauracil, $N^4$-benzoyl-6-azacytosine, hypoxanthine, $N^6$-benzoyladenine, 6-dimethylaminopurine, 6-chloropurine, $N^2$-benzoylguanine, and $N^2$-benzoylthioguanine.

EXAMPLE 10

1 - (3-O-benzoyl-2,5,6-trideoxy-6-diphenoxyphosphinyl-β-D-erythro-hex-5-enofuranosyl)-pyrimidine bases and 9-(3-O-benzoyl - 2,5,6-trideoxy-6-diphenoxyphosphinyl-β-D-erythro-hex-5-enofuranosyl)-purine bases Repeating the procedure of Example 5 with 1-(3-O-benzoyl-2-deoxy-β-D-ribofuranosyl)-pyrimidine bases and 9-(3-O-benzoyl-2-deoxy-β-D-ribofuranosyl)-purine bases yields the corresponding 1-(3-O-benzoyl-2,5,6-trideoxy-6-diphenoxyphosphinyl-β-D-erythro-hex - 5 - enofuranosyl)-pyrimidine bases and 9-(3-O-benzoyl-2,5,6-trideoxy-6-diphenoxyphosphinyl-β-D-erythro-hex-5 - enofuranosyl)-purine bases wherein the pyrimidine and purine bases include uracil, $N^4$-benzoylcytosine, 5-fluorouracil, $N^4$-benzoyl-5-fluorocytosine, thymine, 5-trifluoromethyluracil, $N^4$-benzoyl-5-trifluoromethylcytosine, 6-azauracil, $N^4$- benzoyl-6-azacytosine, 6-azathymine, hypoxanthine, $N^6$-benzoyladenine, 6-dimethylaminopurine, 6-chloropurine, $N^2$-benzoylguanine, xanthine, 2,6-dichloropurine, $N^6$-benzoyl-8-azaadenine, and $N^2$-benzoylthioguanine.

EXAMPLE 11

1 - (3-O-benzoyl-2,5,6-trideoxy-6-diphenoxyphosphinyl-β-D-threo-hex-5-enofuranosyl)-pyrimidine bases and 9-(3-O-benzoyl - 2,5,6 - trideoxy-6-diphenoxyphosphinyl-β-D-threo-hex-5-enofuranosyl)-purine bases Repeating the procedure of Example 5 with 1-(3-O-benzoyl-2-deoxy-β-D-xylofuranosyl) - pyrimidine bases and 9-(3-O-benzoyl-2-deoxy-β-D-xylofuranosyl) - purine bases yields the corresponding 1-(3-O-benzoyl-2,5,6-trideoxy-6-diphenoxyphosphinyl-β-D-threo-hex - 5 - enofuranosyl)-pyrimidine bases and 9-(3-O-benzoyl-2,5,6-trideoxy-6-diphenoxyphosphinyl-β-D-threo-hex-5 - enofuranosyl)-purine bases wherein the pyrimidine and purine bases include uracil, thymine, and $N^6$-benzoyladenine.

EXAMPLE 12

1 - (2-O-benzoyl-3,5,6-trideoxy-6-diphenoxyphosphinyl-β-D-erythro-hex-5-enofuranosyl)-pyrimidine bases and 9-(2-O-benzoyl-3,5,6-trideoxy - 6 - diphenoxyphosphinyl-β-D-erythro-5-enofuranosyl)-purine bases Repeating the procedure of Example 5 with 1-(2-O-benzoyl-3-deoxy-β-D-ribofuranosyl)-pyrimidine bases and 9-(2-O-benzoyl-3-deoxy-β-D-ribofuranosyl)-purine bases yields the corresponding 1-(2-O-benzoyl-3,5,6-trideoxy-6-diphenoxyphosphinyl-β-D-erythro-hex-5 - enofuranosyl)-pyrimidine bases and 9-(2-O-benzoyl-3,5,6-trideoxy-6-diphenoxyphosphinyl - β - D-erythro-hex-5-enofuranosyl)-purine bases, wherein the pyrimidine and purine bases include uracil, $N^4$-benzoylcytosine, 5-bromouracil, $N^4$-benzoyl-5-bromocytosine, 5-chlorouracil, $N^4$-benzoyl-5-chlorocytosine, 5-iodouracil, $N^4$-benzoyl-5-iodocytosine, 5-fluorouracil, $N^4$-benzoyl-5-fluorocytosine, thymine, $N^4$-benzoyl-5-methylcytosine, 5-aminouracil, $N^4$-benzoyl-5-aminocytosine, 5-methylaminouracil, $N^4$-benzoyl-5-methylaminocytosine, 5-benzoyloxyuracil, hypoxanthine, $N^6$-benzoyladenine, 6-dimethylaminopurine, 6-chloropurine, $N^2$-benzoylguanine, xanthine, 2,6-dichloropurine, and 2,6-di(benzoylamino)purine.

EXAMPLE 13

1-(2,3,5,6-tetradeoxy - 6 - diphenoxyphosphinyl-β-D-glycero-hex-5-enofuranosyl)-pyrimidine bases and 9-(2,3, 5,6-tetradeoxy - 6 - diphenoxyphosphinyl-β-D-glycero-hex-5-enofuranosyl)-purine bases Repeating the procedure of Example 5 with 1-(2,3-dideoxy-β-D-ribofuranosyl)-pyrimidine bases and 9-(2,3-dideoxy-β-D-ribofuranosyl)-purine bases yields the corresponding 1-(2,3,5,6-tetradeoxy-6-diphenoxyphosphinyl-β-D-glycero-hex-5-enofuranosyl)-pyrimidine bases and 9-(2,3,5,6-tetradeoxy - 6 - diphenoxyphosphinyl-β-D-glycero-hex-5-enofuranosyl)-purine bases, wherein the pyrimidine and purine bases include uracil, 5-fluorouracil, cytosine, thymine, and adenine.

EXAMPLE 14

Repeating the procedure of Example 5 but replacing diphenyl triphenylphosphoranylidenemethylphosphonate with dibenzyl triphenylphosphoranylidenemethylphosphonate,
diethyl triphenylphosphoranylidenemethylphosphonate,
diallyl triphenylphosphoranylidenemethylphosphonate,
triphenylphosphoranylidenemethylphosphonodimorpholidate,
triphenylphosphoranylidenemethylphosphonodipiperidate,
N,N,N',N'-tetramethyl triphenylphosphoranylidenemethylphosphonodiamide, S,S-diethyl triphenylphosphoranylidenemethyldithiophosphonate, and
S,S-diphenyl triphenylphosphoranylidenemethyldithiophosphonate yields the corresponding 1-(5,6-dideoxy-2,3-O-isopropylidene-6-dibenzyloxyphosphinyl-β-D-ribo-hex-5-enofuranosyl)-uracil,
1-(5,6-dideoxy-2,3,-O-isopropylidene-6-diethoxyphosphinyl-β-D-ribo-hex-5-enofuranosyl)-uracil,
1-(5,6-dideoxy-2,3-O-isopropylidene-6-diallyloxyphosphinyl-β-D-ribo-hex-5-enofuranosyl)-uracil,
1-(5,6-dideoxy-2,3-O-isopropylidene-6-dimorpholinophosphinyl-β-D-ribo-hex-5-enofuranosyl)-uracil,
1-(5,6-dideoxy-2,3-O-isopropylidene-6-dipiperidinophosphinyl-β-D-ribo-hex-5-enofuranosyl)-uracil,
1-[5,6-dideoxy-2,3-O-isopropylidene-6-bis(dimethylamino)phosphinyl-β-D-ribo-hex-5-enofuranosyl]-uracil,
1-[5,6-dideoxy-2,3-O-isopropylidene-6-di(ethylthio)-phosphinyl-β-D-ribo-hex-5-enofuranosyl]-uracil, and
1-[5,6-dideoxy-2,3-O-isopropylidene-6-di(phenylthio)phosphinyl-β-D-ribo-hex-5-enofuranosyl]-uracil, respectively.

EXAMPLE 15

9-(5,6-dideoxy-2,3-O-isopropylidene-6-diphenoxyphosphinyl-β-D-ribo-hex-5-enofuranosyl)-hypoxanthine A solution of 308 mg. of 9-(2,3-O-isopropylidene-β-D-ribo-furanosyl)-hypoxanthine, 0.62 g. of dicyclohexylcarbodiimide, 0.08 ml. of pyridine and 0.04 ml. of trifluoroacetic acid in 2.5 ml. of dimethyl sulfoxide is allowed to stand at room temperature for 5 hours. The dicyclohexylurea which precipitates is filtered off and washed with three 3 ml. portions of dimethyl sulfoxide. To the combined filtrate and washings which contain 9-(2,3 - O - isopropylidene - β - D - ribo - pentodialdo-1,4-furanosyl)hypoxanthine is added a solution of 535 mg. of tri-n-butyl-(diphenoxyphosphinylmethyl) - phosphonium chloride and 125 mg. of potassium-t-butoxide in 3 ml. of dimethyl sulfoxide. This solution is stored at room temperature for 15 minutes and is then poured into 75 ml. of water to give an oil which is redissolved by adding 75 ml. of ethyl acetate. 260 mg. of oxalic acid dihydrate is added to the mixture, and after 30 minutes more dicyclohexylurea is removed by filtration. The ethyl acetate layer is separated and washed with two further portions of water. The combined water washes are extracted with 50 ml. of ethyl acetate, and the combined ethyl acetate layers are dried over magnesium sulfate and evaporated to dryness to yield 0.93 g. of an oily residue. This residue is purified with a 1 m. x 20 cm., 1.3 mm. thick preparative silica-gel plate developed in isopropanol: chloroform (1:9), giving 0.45 g. of a syrup, which on a crystallization from benzene yields 9-(5,6-dideoxy-2,3-O-isopropylidene-6-diphenoxyphosphinyl - β - D-ribo-hex-5-enofuranosyl)-hypoxanthine.

EXAMPLE 16

9-(5,6-dideoxy - 2,3 - O-isopropylidene-6-dimethoxyphosphinyl-β-D-ribo-hex-5-enofuranosyl)-hypoxanthine To a solution of 1 mmole of 9-(2,3-O-isopropylidene-β-D-ribo-pentodialdo-1,4 - furanosyl)-hypoxanthine is dimethyl sulfoxide (prepared in situ by the procedure of Example 15) is added a solution of 1 mmole of dimethyl tri-n-butylphosphoranylidenemethylphosphonate in 10 ml. of methanol. After 15 minutes, the reaction mixture is poured into 75 ml. of water saturated with sodium chloride to give an oil which is redissolved by adding 75 ml. of ethyl acetate. 260 mg. of oxalic acid dihydrate is added to the mixture, and after 30 minutes, more dicyclohexylurea is removed by filtration. The ethyl acetate layer is separated and washed with two further portions of salt water. The combined water washes are extracted with 50 ml. of ethyl acetate, and the combined ethyl acetate layers are dried over magnesium sulfate and evaporated to dryness to yield an oily residue. This residue is purified as described in Example 15 to yield 9-(5,6-dideoxy-2,3-O-isopropylidene- 6 - dimethoxyphosphinyl-β-D-ribo-hex-5-enofuranosyl)-hypoxanthine.

EXAMPLE 17

9-(5,6-dideoxy-2,3-O-isopropylidene-6-diphenoxyphosphinyl-β-D-ribo-hex-5-enofuranosyl)-6-mercaptopurine 600 mg. of 6-chloro-9-(5,6-dideoxy - 2,3-O-isopropylidene-6-diphenoxyphosphinyl - β - D - ribo-hex-5-enofuranosyl)-purine and 100 mg. of thiourea are dissolved in absolute ethanol (8 ml.) and heated under reflux for one hour. At this time, thin layer chromatography shows the formation of a major slightly slower moving product. The mixture is evaporated to dryness and the residue partitioned between chloroform and water. Chromatography of the chloroform solution on silicic acid gives 9-(5,6-dideoxy - 2,3 - O - isopropylidene - 6 - diphenoxyphosphinyl - β - D - ribo - hex - 5 - enofuranosyl) - 6-mercaptopurine.

Repeating the above procedure but replacing 6-chloro-9 - (5,6 - dideoxy - 2,3 - O - isopropylidene - 6 - diphenoxyphosphinyl - β - D - ribo - hex - 5 - enofuranosyl)-purine with the products of Examples 8, 9, 10 and 12 having the 6-chloropurin-9-yl group yields the corresponding 9-(2,3-O-benzoyl-5,6-dideoxy-6-diphenoxyphosphinyl-β-D-xylo-hex-5-enofuranosyl)-6-mercaptopurine,
9-(2,3-di-O-benzoyl-5,6-dideoxy-6-diphenoxyphosphinyl-β-D-arabino-hex-5-enofuranosyl)-6-mercaptopurine,
9-(3-O-benzoyl-2,5,6-trideoxy-6-diphenoxyphosphinyl-β-D-erythro-hex-5-enofuranosyl)-6-mercaptopurine, and
9-(2-O-benzoyl-3,5,6-trideoxy-6-diphenoxyphosphinyl-β-D-erythro-hex-5-enofuranosyl)-6-mercaptopurine.

EXAMPLE 18

9 - (5,6 - dideoxy-2,3-O-isopropylidene-6-diphenoxyphosphinyl-β-D-ribo-hex - 5 - enofuranosyl)-6-methylmercaptopurine 600 mg. of 6 -chloro - 9 - (5,6 - dideoxy - 2,3 - O - isopropylidene - 6 - diphenoxyphosphinyl - β - D - ribo - hex-5 - enofuranosyl) - purine and 100 mg. of thiourea are dissolved in absolute ethanol (8 ml.) and heated under reflux for one hour. Methyl iodide (1 ml.) is added and the mixture stirred at room temperature for 4 hours while dilute methanolic sodium hydroxide is added to maintain a slightly alkaline pH. The solvent is then evaporated, and the residue is partitioned between chloroform and water. Chromatography of the chloroform phase on silicic acid gives 9-(5,6-dideoxy-2,3-O-isopropylidene-6-diphenoxyphosphinyl - β - D - ribo - hex-5-enofuranosyl)-6-methylmercaptopurine.

Repeating the above procedure but replacing 6-chloro-9 - (5,6 - dideoxy - 2,3 - O - isopropylidene - 6 - diphenoxyphosphinyl - β - D - ribo - hex - 5 - enofuranosyl)-purine with the products of Examples 8, 9, 10 and 12 having the 6-chloropurin-9-yl group yields the corresponding 9-(5,6-dideoxy-2,3-di-O-benzoyl-6-diphenoxyphosphinyl-β-D-xylo-hex-5-enofuranosyl)-6-methylmercaptopurine,
9-(2,3-di-O-benzoyl-5,6-dideoxy-6-diphenoxyphosphinyl-β-D-arabino-hex-5-enofuranosyl)-6-methylmercaptopurine,
9-(3-O-benzoyl-2,5,6-trideoxy-6-diphenoxyphosphinyl-β-D-erythro-hex-5-enofuranosyl)-6-methylmercaptopurine, and
9-(2-O-benzoyl-3,5,6-trideoxy-6-diphenoxyphosphinyl-β-

D-erythro-hex-5-enofuranosyl)-6-methylmercaptopurine.

EXAMPLE 19

1-(5,6-dideoxy-6-hydroxyphenoxyphosphinyl-β-D-ribo-hex-5-enofuranosyl)-uracil 1.54 grams (3 mmole) of 1-(5,6-dideoxy-2,3-O-isopropylidene-6-diphenoxyphosphinyl - β - D - ribo-hex-5-enofuranosyl)-uracil is dissolved in 15 ml. of dioxan, and 15 ml. of 1 N lithium hydroxide solution is then added. The reaction mixture is kept at room temperature (22° C.) for 60 min., and is treated with Dowex 50 (H+) until the pH of the solution is ca. 8. The resin is removed by filtration, and the filtrate is evaporated to dryness. The residue is dissolved in 20 ml. of 80% acetic acid, and the solution is heated at 100° C. for 90 min. The solution is concentrated and the residue dissolved in methanol and reconcentrated. The residue is dissolved in 200 ml. water, the pH is adjusted to 7 with triethylamine, and the solution is applied to a column of DEAE Sephadex (40× 35 cm.) ($HCO_3^-$ form). The column is eluted with a gradient of triethylammonium bicarbonate (3 liters 0.005 M to 3 liters 0.15 M); 20 ml. fractions are collected every 6 minutes. The appropriate UV absorbing fractions are pooled and concentrated to dryness. The residue is reevaporated with methanol several times to give the pure triethylammonium salt of 1-(5,6-dideoxy - 6 - hydroxyphenoxyphosphinyl-β-D-ribo-hex-5-enofuranosyl)-uracil.

EXAMPLE 20

1-(5,6-dideoxy - 6 - hydroxyphenoxyphosphinyl-β-D-ribo-hex-5-enofuranosyl)-pyrimidine bases and 9-(5,6-dideoxy - 6-hydroxyphenoxyphosphinyl-β-D-ribo-hex-5-enofuranosyl)-purine bases Repeating the procedure of Example 19 with the other products of Example 5 followed by treatment with 9 N aqueous ammonia for 10 hours yields the corresponding salts of 1-(5,6-dideoxy-6-hydroxyphenoxyphosphinyl-β-D-ribo-hex-5-enofuranosyl)-pyrimidine bases wherein the pyrimidine bases include cytosine, 5-bromouracil, 5-bromocytosine, 5-chlorouracil, 5-chlorocytosine, 5-iodouracil, 5-iodocytosine, 5-fluorouracil, 5-fluorocytosine, thymine, 5-methylcytosine, 5-trifluoromethyluracil, 5-trifluoromethylcytosine, 5 - aminouracil, 5 - aminocytosine, 5-methylaminouracil, 5-methylaminocytosine, 6-azauracil, 6-azacytosine, and 6-azathymine.

Repeating the procedure of Example 19 with the products of Example 6 yields the corresponding 9-(5,6-dideoxy - 6 - hydroxyphenoxyphosphinyl-β-D-ribo-hex-5-enofuranosyl)-purine bases wherein the purine bases include hypoxanthine, 7-deazaadenine, 7-deazaguanine, adenine, 6-dimethylaminopurine, 6-chloropurine, guanine, xanthine, 2,6-dichloropurine, 2,6-dimethylaminopurine, 2,6-diaminopurine, 8-azaadenine, thioguanine, 2-fluoroadenine, 8-aza-9-deazaadenine and 8-azaguanine.

EXAMPLE 21

1-(5,6-dideoxy - 6 - hydroxyphenoxyphosphinyl-β-D-xylo-hex-5-enofuranosyl)-pyrimidine bases and 9-(5,6-dideoxy - 6-hydroxyphenoxyphosphinyl-β-D-xylo-hex-5-enofuranosyl)-purine bases Repeating the procedure of Example 19 with the products of Example 8 followed by treatment with 9 N aqueous ammonia for 10 hours yields the corresponding 1-(5,6-dideoxy-6-hydroxyphenoxyphosphinyl - β - D - xylo-hex-5-enofuranosyl)-pyrimidine bases and 9-(5,6-dideoxy-6 - hydroxyphenoxyphosphinyl-β-D-xylo-hex-5-enofuranosyl)-purine bases wherein the pyrimidine and purine bases include uracil, cytosine, 5-fluorouracil, 5-fluorocytosine, thymine, 5-methylcytosine, hypoxanthine, adenine, 6 - dimethylaminopurine, 6 - chloropurine, guanine, xanthine, 2,6-dichloropurine and thioguanine.

EXAMPLE 22

1 - (5,6-dideoxy-6-hydroxyphenoxyphosphinyl)-β-D-arabino-hex-5-enofuranosyl)-pyrimidine bases and 9-(5,6-dideoxy-6-hydroxyphenoxyphosphinyl - β - D - arabinohex-5-enofuranosyl)-purine bases Repeating the procedure of Example 21 with the products of Example 9 yields the corresponding 1-(5,6-dideoxy-6-hydroxyphenoxyphosphinyl - β - D - arabino-hex-5-enofuranosyl)-pyrimidine bases and 9-(5,6-dideoxy-6-hydroxyphenoxyphosphinyl-β-D-arabino-hex - 5 - enofuranosyl)-purine bases wherein the pyrimidine and purine bases include uracil, cytosine, 5-fluorouracil, 5-fluorocytosine, thymine, 5-methylcytosine, 5-trifluoromethyluracil, 5-trifluoromethylcytosine, 6-azauracil, 6-azacytosine, hypoxanthine, adenine, 6-dimethylaminopurine, 6-chloropurine, guanine and thioguanine.

EXAMPLE 23

1 - (2,5,6 - trideoxy - 6 - hydroxyphenoxyphosphinyl-β-D-erythro-hex-5-enofuranosyl)-pyrimidine bases and 9-(2,5,6-trideoxy - 6 - hydroxyphenoxyphosphinyl-β-D-erythro-hex-5-enofuranosyl)purine bases Repeating the procedure of Example 21 with the products of Example 10 yields the corresponding 1-(2,5,6-trideoxy - 6-hydroxyphenoxyphosphinyl-β-D-erythro-hex-5-enofuranosyl)-pyrimidine bases and 9-(2,5,6-trideoxy-6-hydroxyphenoxyphosphinyl - β - D - erythro-hex-5-enofuranosyl)-purine bases wherein the pyrimidine and purine bases include uracil, cytosine, 5-fluorouracil, 5-fluorocytosine, thymine, 5-trifluoromethyluracil, 5-trifluoromethylcytosine, 6-azauracil, 6-azacytosine, 6-azathymine, hypoxanthine, adenine, 6-dimethylaminopurine, 6-chloropurine, guanine, xanthine, 2,6-dichloropurine, 8-azaadenine and thioguanine.

EXAMPLE 24

1-(2,5,6-trideoxy - 6 - hydroxyphenoxyphosphinvyl-β-D-threo-hex-5-enofuranosyl)-pyrimidine bases and 9-(2,5,6-trideoxy - 6 - hydroxyphenoxyphosphinyl-β-D-threo-hex-5-enofuranosyl)-purine bases Repeating the procedure of Example 21 with the products of Example 11 yields the corresponding 1-(2,5,6-trideoxy-6-hydroxyphenoxyphosphinyl-β-D-threo - hex-5-enofuranosyl)-pyrimidine bases and 9-(2,5,6-trideoxy-6-hydroxyphenoxyphosphinyl-β-D-threo-hex - 5 - enofuranosyl)-purine bases wherein the pyrimidine and purine bases include uracil, thymine and adenine.

EXAMPLE 25

1 - (3,5,6-trideoxy - 6 - hydroxyphenoxyphosphinyl-β-D-erythro-hex-5-enofuranosyl)-pyrimidine bases and 9-3,5,6 - trideoxy - 6 - hydroxyphenoxyphosphinyl-β-D-erythro-hex-5-enofuranosyl)-purine bases Repeating the procedure of Example 21 with the products of Example 12 yields the corresponding 1-(3,5,6-trideoxy-6-hydroxyphenoxyphosphinyl-β-D-erythro - hex-5-enofuranosyl)-pyrimidine bases and 9-(3,5,6-trideoxy-6-hydroxyphenoxyphosphinyl-β-D-erythro - hex-5-enofuranosyl)-purine bases wherein the pyrimidine and purine bases include uracil, cytosine, 5-bromouracil, 5-bromocytosine, 5-chlorouracil, 5-chlorocytosine, 5-iodouracil, 5-iodocytosine, 5-fluorouracil, 5-fluorocytosine, thymine, 5-methylcytosine, 5-aminouracil, 5-aminocytosine, 5-methylaminouracil, 5-methylaminocytosine, 5-hydroxyuracil, hypoxanthine, adenine, 6-dimethylaminopurine, 6-chloropurine, guanine, xanthine, 2,6-dichloropurine and 2,6-diaminopurine.

EXAMPLE 26

1 - (2,3,5,6-tetradeoxy-6-hydroxyphenoxyphosphinyl-β-D-glycero-hex-5-enofuranosyl)-pyrimidine bases and 9-(2, 3,5,6 - tetradeoxy - 6-hydroxyphenoxyphosphinyl-β-D-glycero-hex-5-enofuranosyl)-purine bases Repeating the procedure of Example 19 with the products of Example 13 yields the corresponding 1-(2,3,5,6- tetradeoxy-6-hydroxyphenoxyphosphinyl-β-D-glycero-hex-5-enofuranosyl)-pyrimidine bases and 9-(2,3,5,6-tetradeoxy-6-hydroxyphenoxyphosphinyl-β-D-glycero-hex-5-enofuranosyl)-purine bases wherein the pyrimidine and purine bases include uracil, 5-fluorouracil, cytosine, thymine and adenine.

EXAMPLE 27

Sodium salt of 1 - (5,6-dideoxy-6-hydroxyphenoxyphosphinyl-β-D-ribo-hex-5-enofuranosyl)-uracil The product of Example 19, the triethylammonium salt of 1 - (5,6 - dideoxy-6-hydroxyphenoxyphosphinyl-β-D-ribo-hex-5-enofuranosyl)-uracil is passed through a column of Dowex 50 (H+) (30× 1 cm.) and the aqueous eluant is concentrated to two-thirds the original volume. The pH of this solution is adjusted to 6 by the addition of 1 N sodium hydroxide, the solution is concentrated to dryness. The residue is crystallized from methanol-acetone to yield the sodium salt of 1-(5,6-dideoxy-6-hydroxyphenoxyphosphinyl-β-D-ribo-hex-5-enofuranosyl)-uracil.

EXAMPLE 28

9-(5,6-dideoxy-6-hydroxyphenoxyphosphinyl-β-D-ribo-hex-5-enofuranosyl)-adenine 1.01 grams of the triethylammonium salt of 9-(5,6-dideoxy - 6-hydroxyphenoxyphosphinyl-β-D-ribo-hex-5-enofuranosyl)adenine is dissolved in 2 ml. of water and 40 ml. of isopropanol. A solution of hydrochloric acid in isopropanol (3 ml. concentrated HCl:7 ml. isopropanol) is added until the pH is about 2 to yield a white precipitate which is removed by centrifugation. The precipitate is washed with isopropanol, ether and is dried in vacuo to yield 9 - (5,6-dideoxy-6-hydroxyphenoxyphosphinyl-β-D-ribo-hex-5-enofuranosyl)adenine.

EXAMPLE 29

1-(5,6-dideoxy-6-dihydroxyphosphinyl-β-D-ribo-hex-5-enofuranosyl)-uracil 0.5 mmole of the triethylammonium salt of 1-(5,6-dideoxy - 6-hydroxyphenoxyphosphinyl-β-D-ribo-hex-5-enofuranosyl)-uracil is dissolved in 37 ml. water, 2.5 ml. of tris(hydroxymethyl)aminomethane-HCl buffer (pH 8) and 0.5 ml. 1 M magnesium acetate. 10 mg. crystalline snake venon (Crotaleus adamanteus) is added, and the solution is incubated at 37° C. for 24 hours. The solution is diluted with water to 100 ml. and applied to a column of DEAE Sephadex (HCO₃⁻ form, 40× 2.5 cm.). The column is eluted with a gradient of triethylammonium bicarbonate (1500 ml. of .0005 M to 1500 ml. of 0.25 M) collecting 15 ml. fractions every 8 min. The appropriate UV absorbing fractions are combined and concentrated to dryness. The residue is reevaporated from methanol several times to give the pure triethylammonium salt of the 1 - (5,6-dideoxy-6-dihydroxyphosphinyl-β-D-ribo-hex-5-enofuranosyl)-uracil.

EXAMPLE 30

1 - (5,6 - dideoxy-6-dihydroxyphosphinyl-β-D-ribo-hex-5-enofuranosyl)-pyrimidine bases and 9-(5,6-dideoxy-6-dihydroxyphosphinyl - β - D-ribo-hex-5-enofuranosyl)-purine bases Repeating the procedure of Example 29 with the products of Example 20 yields the corresponding 1-(5,6-dideoxy - 6-dihydroxyphosphinyl-β-D-ribo-hex-5-enofuranosyl)-pyrimidine bases and 9-(5,6-dideoxy-6-dihydroxyphosphinyl - β - D-ribo-hex-5-enofuranosyl)-purine bases wherein the pyrimidine and purine bases include cytosine, 5-bromouracil, 5-bromocytosine, 5-chlorouracil, 5-chlorocytosine, 5-iodouracil, 5-iodocytosine, 5-fluorouracil, 5-fluorocytosine, thymine, 5-methylcytosine, 5 - trifluoromethyluracil, 5 - trifluoromethylcytosine, 5-aminouracil, 5 - aminocytosine, 5-methylaminouracil 5-methylaminocytosine, 6-azauracil, 6-azacytosine and 6-azathymine, hypoxanthine, 7-deazaadenine, 7-deazaguanine, adenine, 6-dimethylaminopurine, 6-chloropurine, guanine, xanthine, 2,6 - dichloropurine, 2,6 - dimethylaminopurine, 2,6-diaminopurine, 8-azaadenine, thioguanine, 2-fluoroadenine, 8-aza-9-deazaadenine and 8-azaguanine.

EXAMPLE 31

1 - (5,6 - dideoxy-6-dihydroxyphosphinyl-β-D-xylo-hex-5-enofuranosyl)-pyrimidine bases and 9-(5,6-dideoxy-6-dihydroxyphosphinyl - β - D-xylo-hex-5-enofuranosyl)-purine bases Repeating the procedure of Example 29 with the products of Example 21 yields the corresponding 1-(5,6-dideoxy - 6 - dihydroxyphosphinyl-β-D-xylo-hex-5-enofuranosyl)-pyrimidine bases and 9-(5,6-dideoxy-6-dihydroxyphosphinyl - β - D-xylo-hex-5-enofuranosyl)-purine bases wherein the pyrimidine and purine bases include uracil, cytosine, 5 - fluorouracil, 5-fluorocytosine, thymine, 5-methylcytosine, hypoxanthine, adenine, 6-dimethylaminopurine, 6-chloropurine, guanine, xanthine, 2,6-dichloropurine and thioguanine.

EXAMPLE 32

1 - (5,6-dideoxy-6-dihydroxyphosphinyl-β-D-arabino-hex-5-enofuranosyl)-pyrimidine bases and 9-(5,6-dideoxy-6 - dihydroxyphosphinyl-β-D-arabino-hex-5-enofuranosyl)-purine bases Repeating the procedure of Example 29 with the products of Example 22 yields the corresponding 1-(5,6-dideoxy - 6-dihydroxyphosphinyl-β-D-arabino-hex-5-enofuranosyl)-pyrimidine bases and 9-(5,6-dideoxy-6-dihydroxyphosphinyl-β-D-arabino-hex-5-enofuranosyl)-purine bases wherein the pyrimidine and purine bases include uracil, cytosine, 5 - fluorouracil, 5-fluorocytosine, thymine, 5-methylcytosine, 5-trifluoromethyluracil, 5-trifluoromethylcytosine, 6-azauracil, 6-azacytosine, hypoxanthine, adenine, 6-dimethylaminopurine, 6-chloropurine, guanine and thioguanine.

EXAMPLE 33

1 - (2,5,6 - trideoxy-6-dihydroxyphosphinyl-β-D-erythro-hex-5-enofuranosyl)-pyrimidine bases and 9-(2,5,6-trideoxy - 6-dihydroxyphosphinyl-β-D-erythro-hex-5-enofuranosyl)-purine bases Repeating the procedure of Example 29 with the products of Example 23 yields the corresponding 1-(2,5,6-trideoxy - 6-dihydroxyphosphinyl-β-D-erythro-hex-5-enofuranosyl)-pyrimidine bases and 9 - (2,5,6-trideoxy-6-dihydroxyphosphinyl-β-D-erythro-hex-5-enofuranosyl)-purine bases wherein the pyrimidine and purine bases include uracil, cytosine, 5-fluorouracil, 5-fluorocytosine, thymine, 5 - trifluoromethyluracil, 5-trifluoromethylcytosine, 6-azauracil, 6-azacytosine, 6-azathymine, hypoxanthine, adenine 6-dimethylaminopurine, 6-chloropurine, guanine, xanthine, 2,6-dichloropurine, 8-azaadenine and thioguanine.

EXAMPLE 34

1 - (2,5,6 - trideoxy - 6-dihydroxyphosphinyl-β-D-threo-hex - 5-enofuranosyl)-pyrimidine bases and 9-(2,5,6-trideoxy - 6 - dihydroxyphosphinyl - β-D-threo-hex-5-enofuranosyl)-purine bases Repeating the procedure of Example 29 with the products of Example 24 yields the corresponding 1-(2,5,6-trideoxy - 6 - dihydroxyphosphinyl - β - D - threo-hex-5-enofuranosyl)-pyrimidine bases and 9-(2,5,6-trideoxy-6-dihydroxyphosphinyl - β - D-threo-hex-5-enofuranosyl)-purine bases wherein the pyrimidine and purine bases include uracil, thymine and adenine.

EXAMPLE 35

1 - (3,5,6 - trideoxy - 6 - dihydroxyphosphinyl - β - D-erythro-hex - 5-enofuranosyl)-pyrimidine bases and 9-(3,5,6 - trideoxy - 6 - dihydroxyphosphinyl - β - D-erythro-hex-5-enofuranosyl)-purine bases Repeating the procedure of Example 29 with the products of Example 25 yields the corresponding 1-(3,5,6- trideoxy - 6 - dihydroxyphosphinyl - β - D - erythro-hex-5 - enofuranosyl)-pyrimidine bases and 9-(3,5,6-trideoxy-6-dihydroxyphosphinyl - β - D - erythro - hex - 5 - enofuranosyl)-purine bases wherein the pyrimidine and purine bases include uracil, cytosine, 5-bromouracil, 5-bromocytosine, 5-chlorouracil, 5-chlorocytosine, 5-iodouracil, 5-iodocytosine, 5-fluorouracil, 5-fluorocytosine, thymine, 5-methylcytosine, 5-aminouracil, 5-aminocytosine, 5-methylaminouracil, 5-methylaminocytosine, 5-hydroxyuracil, hypoxanthine, adenine, 6-dimethylaminopurine, 6-chloropurine, guanine, xanthine, 2,6 - dichloropurine and 2,6-diaminopurine.

EXAMPLE 36

1 - (2,3,5,6 - tetradeoxy - 6 - dihydroxyphosphinyl - β-D-glycero - hex - 5 - enofuranosyl) - pyrimidine bases and 9 - (2,3,5,6 - tetradeoxy - 6 - dihydroxyphosphinyl-β-D-glycero-hex-5-enofuranosyl)-purine bases Repeating the procedure of Example 29 with the products of Example 26 yields the corresponding 1-(2,3,5,6-tetradeoxy - 6 - dihydroxyphosphinyl - β - D - glycero-hex - 5 - enofuranosyl)-pyrimidine bases and 9-(2,3,5,6-tetradeoxy - 6 - dihydroxyphosphinyl - β - D-glycero-hex-5-enofuranosyl)-purine bases wherein the pyrimidine and purine bases include uracil, 5-fluorouracil, cytosine, thymine and adenine.

EXAMPLE 37

Barium salt of 9-(5,6-dideoxy-6-dihydroxyphosphinyl-β-D-ribo-hex-5-enofuranosyl)-adenine 225 milligrams of the triethylammonium salt of 9-(5,6-dideoxy - 6 - dihydroxyphosphinyl - β - D-ribo-hex-5-enofuranosyl)-adenine is dissolved in 5 ml. of water, and a solution of 250 mg. of barium acetate in 1 ml. of water is added. After adjusting the pH to 8.0 with barium hydroxide, the addition of 20 ml. of ethanol then yields a precipitate of the barium salt which is removed by centrifugation, reprecipitated with aqueous ethanol, and dried.

EXAMPLE 38

9-(5,6-dideoxy-6-dihydroxyphosphinyl-β-D-ribo-hex-5-enofuranosyl)-adenine 1.01 grams of the triethylammonium salt of 9-(5,6-dideoxy - 6 - dihydroxyphosphinyl - β - D - ribo-hex-5-enofuranosyl)-adenine is dissolved in 2 ml. of water and 40 ml. of isopropanol. A solution of hydrochloric acid in isopropanol (3 ml. of concentrated HCl:7 ml. of isopropanol) is added until the pH is about 2 to yield a white precipitate which is removed by centrifugation. The precipitate is washed with isopropanol, ether and dried in vacuo to yield 9 - (5,6-dideoxy-6-dihydroxyphosphinyl-β-D-ribo-hex-5-enofuranosyl)-adenine.

EXAMPLE 39

5-methylaminouracil and 5-aminouracil compounds

Free acid 5 - bromo-1-(5,6-dideoxy-6-dihydroxyphosphinyl - β - D - ribo - hex - 5 - enofuranosyl)-uracil (0.4 g.) and anhydrous methylamine are heated together in a stainless steel bomb at 80° C. for 18 hours. After evaporation of the solvent, the residue is purified by chromatography on a column of DEAE Sephadex using a linear gradient (0 to 0.2 M) of triethylammonium bicarbonate. Following evaporation in vacuum of the pooled fractions containing the desired product and removal of residual buffer by repeated evaporation with methanol, the residue is dissolved in water containing an excess of barium acetate, adjusted to pH of 8.5 with barium hydroxide and filtered. Addition of 2 volumes of ethanol to the filtrate gave the barium salt of 1-(5,6-dideoxy-6-dihydroxyphosphinyl - β - D - ribo - hex - 5 - enofuranosyl)-5-methylaminouracil. Addition of one molar equivalent of sulfuric acid to a solution of the product yields a solution of the free acid.

Repeating the above procedure replacing anhydrous methylamine with dimethylamine and anhydrous ammonia yields the corresponding 5-dimethylamino- and 5-amino - 1 - (5,6 - dideoxy - 6 - dihydroxyphosphinyl-β-D - ribo - hex - 5 - enofuranosyl)-uracil, respectively.

Repeating the above procedures with 5-bromo-1-(5,6-dideoxy-6-dihydroxyphosphinyl-β-D-xylo-hex-5-enofuranosyl)-uracil,
5-bromo-1-(5,6-dideoxy-6-dihydroxyphosphinyl-β-D-arabino-hex-5-enofuranosyl)-uracil,
5-bromo-1-(2,5,6-trideoxy-6-dihydroxyphosphinyl-β-D-erythro-hex-5-enofuranosyl)-uracil,
5-bromo-1-(2,5,6-trideoxy-6-dihydroxyphosphinyl-β-D-threo-hex-5-enofuranosyl)-uracil,
5-bromo-1-(3,5,6-trideoxy-6-dihydroxyphosphinyl-β-D-erythro-hex-5-enofuranosyl)-uracil, and
5-bromo-1-(2,3,5,6-tetradeoxy-6-dihydroxyphosphinyl-β-D-glycero-hex-5-enofuranosyl)-uracil, yields the corresponding compounds 5-methylaminouracil and 5-aminouracil groups.

EXAMPLE 40

5-methylaminocytosine and 5-aminocytosine compounds

Repeating the procedure of Example 39 with 5-bromo-1-(5,6-dideoxy-6-dihydroxyphosphinyl-β-D-ribo-hex-5-enofuranosyl)-cytosine,
5-bromo-1-(5,6-dideoxy-6-dihydroxyphosphinyl-β-D-xylo-hex-5-enofuranosyl)-cytosine,
5-bromo-1-(2,5,6-trideoxy-6-dihydroxyphosphinyl-β-D-erythro-hex-5-enofuranosyl)-cytosine,
5-bromo-1-(2,5,6-trideoxy-6-dihydroxyphosphinyl-β-D-threo-hex-5-enofuranosyl)-cytosine,
5-bromo-1-(3,5,6-trideoxy-6-dihydroxyphosphinyl-β-D-erythro-hex-5-enofuranosyl)-cytosine, and
5-bromo-1-(2,3,5,6-tetradeoxy-6-dihydroxyphosphinyl-β-D-glycero-hex-5-enofuranosyl)-cytosine yields the corresponding compounds containing 5-methylaminocytosine, 5-dimethylamino and 5-aminocytosine groups.

EXAMPLE 41

6-dimethylaminopurine compounds

Repeating the procedure of Example 39 but replacing methylamine with dimethylamine and replacing 5-bromo-1-(5,6-dideoxy - 6 - dihydroxyphosphinyl-β-D-ribo-hex-5-enofuranosyl)-uracil with 6-chloro-9-(5,6-dideoxy-6-dihydroxyphosphinyl-β-D-ribo-hex-5-enofuranosyl)-purine,
6-chloro-9-(5,6-dideoxy-6-dihydroxyphosphinyl-β-D-xylo-hex-5-enofuranosyl)-purine,
6-chloro-9-(5,6-dideoxy-6-dihydroxyphosphinyl-β-D-arabino-hex-5-enofuranosyl)-purine,
6-chloro-9-(2,5,6-trideoxy-6-dihydroxyphosphinyl-β-D-erythro-hex-5-enofuranosyl)-purine, and
6-chloro-9-(3,5,6-trideoxy-6-dihydroxyphosphinyl-β-D-erythro-hex-5-enofuranosyl)-purine yields the corresponding compounds containing a 6-dimethylaminopurine group.

EXAMPLE 42

2,6-dimethylaminopurine and 2,6-diaminopurine compounds

Repeating the procedure of Example 39 with 2,6-dichloro-9-(5,6-dideoxy-6-dihydroxyphosphinyl-β-D-ribo-hex-5-enofuranosyl)-purine,
2,6-dichloro-9-(5,6-dideoxy-6-dihydroxyphosphinyl-β-D-xylo-hex-5-enofuranosyl)-purine,
2,6-dichloro-9-(2,5,6-trideoxy-6-dihydroxyphosphinyl-β-D-erythro-hex-5-enofuranosyl)-purine, and
2,6-dichloro-9-(3,5,6-trideoxy-6-dihydroxyphosphinyl-β-D-erythro-hex-5-enofuranosyl)-purine yields the corresponding compounds containing 2,6- di(methylamino)purine groups and 2,6-diaminopurine groups.

EXAMPLE 43

6-mercaptopurine compounds

Repeating the procedure of Example 17 with 6-chloro-9-(5,6-dideoxy-6-dihydroxyphosphinyl-β-D-ribo-hex-5-enofuranosyl)-purine,
6-chloro-9-(5,6-dideoxy-6-dihydroxyphosphinyl-β-D-xylo-hex-5-enofuranosyl)-purine,
6-chloro-9-(5,6-dideoxy-6-dihydroxyphosphinyl-β-D-arabino-hex-5-enofuranosyl)-purine,
6-chloro-9-(2,5,6-trideoxy-6-dihydroxyphosphinyl-β-D-erythro-hex-5-enofuranosyl)-purine, and
6-chloro-9-(3,5,6-trideoxy-6-dihydroxyphosphinyl-β-D-erythro-hex-5-enofuranosyl)-purine but purifying the products by ion exchange chromatography rather than silicic acid chromatography yields the corresponding compounds having 6-mercaptopurine groups.

EXAMPLE 44

6-methylmercaptopurine compounds

Repeating the procedure of Example 18 with 6-chloro-9-(5,6-dideoxy-6-dihydroxyphosphinyl-β-D-ribo-hex-5-enofuranosyl)-purine,
6-chloro-9-(5,6-dideoxy-6-dihydroxyphosphinyl-β-D-xylo-hex-5-enofuranosyl)-purine,
6-chloro-9-(5,6-dideoxy-6-dihydroxyphosphinyl-β-D-arabino-hex-5-enofuranosyl)-purine,
6-chloro-9-(2,5,6-trideoxy-6-dihydroxyphosphinyl-β-D-erythro-hex-5-enofuranosyl)-purine, and
6-chloro-9-(3,5,6-trideoxy-6-dihydroxyphosphinyl-β-D-erythro-hex-5-enofuranosyl)-purine but purifying the products by ion exchange chromatography rather than silicic acid chromatography yields the corresponding compounds with 6-methylmercaptopurine groups.

EXAMPLE 45

6-hydroxylaminopurine compounds 6-chloro-9-(5,6-dideoxy-6-dihydroxyphosphinyl-β-D-ribo-hex-5-enofuranosyl)-purine (0.4 g.) dissolved in ethanol containing an excess of hydroxylamine is heated under reflux for 12 hours and evaporated to dryness. The residue is dissolved in water and purified by ion-exchange chromatography on a column of DEAE Sephadex in the bicarbonate form, eluting with a gradient of triethylammonium bicarbonate (0.0–0.2 M). The appropriate ultraviolet-absorbing fractions are pooled and evaporated to dryness. The residue is re-evaporated several times with methanol to yield the triethylammonium salt of 9-(5,6-dideoxy-6-dihydroxyphosphinyl-β-D-ribo-hex-5-enofuranosyl)-6-hydroxylaminopurine. The free-acid can be obtained by passage of this salt through a Dowex 50 column in hydrogen form.

Repeating this procedure with 6-chloro-9-(5,6-dideoxy-6-dihydroxyphosphinyl-β-D-xylo-hex-5-enofuranosyl)-purine,
6-chloro-9-(5,6-dideoxy-6-dihydroxyphosphinyl-β-D-arabino-hex-5-enofuranosyl)-purine,
6-chloro-9-(2,5,6-trideoxy-6-dihydroxyphosphinyl-β-D-erythro-hex-5-enofuranosyl)-purine, and
6-chloro-9-(3,5,6-trideoxy-6-dihydroxyphosphinyl-β-D-erythro-hex-5-enofuranosyl)-purine yields the corresponding compounds containing a 6-hydroxylaminopurine group.

We claim:

1. A compound selected from the group of compounds having the formulas:

(I), (II), (III) [structural formulas]

wherein $R^1$ is a pyrimidine or purine base or a hydrolyzable acyl derivative thereof derived from a carboxylic acid having from 1 to 12 carbon atoms;

$R^2$ and $R^3$ each is hydrogen, hydroxy or a hydrolyzable ester thereof derived from a carboxylic acid having from 1 to 12 carbon atoms;

$R^2$ and $R^3$ together are an acetal group;

$R^6$, $R^7$ and $R^8$ each is hydroxy or a hydrolyzable ester thereof derived from a carboxylic acid having from 1 to 12 carbon atoms; and $R^{13}$ and $R^{14}$ each is —OM, —OR$^9$, —SR$^{10}$,

[piperidinyl and morpholinyl structures]

or —NR$^{11}$R$^{12}$ wherein M is hydrogen or a pharmaceutically acceptable cation, each of $R^9$ and $R^{10}$ is lower alkyl, lower alkenylmethyl, aryl having from 6 to 12 carbons, halo, nitro, lower alkoxy, or diloweralkylamino substituted aryl, the aryl group of said substituted aryl having from 6 to 12 carbon atoms, and each of $R^{11}$ and $R^{12}$ is lower alkyl.

2. A compound of claim 1 represented by the formula:

(I) [structural formula]

wherein $R^1$, $R^2$, $R^3$, $R^{13}$ and $R^{14}$ are as defined in claim 1.

3. A compound of claim 2 wherein at least one of $R^{13}$ and $R^{14}$ is OR$^9$.

4. A compound of claim 3 wherein OR$^9$ is aryloxy having from 6 to 12 carbon atoms.

5. A compound of claim 4 wherein one of $R^{13}$ and $R^{14}$ is OM.

6. A compound of claim 2 wherein both $R^{13}$ and $R^{14}$ are OM.

7. A compound of claim 1 represented by the formula:

(II) [structural formula]

wherein $R^1$, $R^6$, $R^7$, $R^{13}$ and $R^{14}$ are as defined in claim 1.

8. A compound of claim 7 wherein at least one of $R^{13}$ and $R^{14}$ is OR$^9$.

9. A compound of claim 8 wherein OR$^9$ is aryloxy having from 6 to 12 carbon atoms.

10. A compound of claim 9 wherein at least one of $R^{13}$ and $R^{14}$ is OM.

11. A compound of claim 7 wherein both $R^{13}$ and $R^{14}$ are OM.

12. A compound of claim 1 represented by the formula:
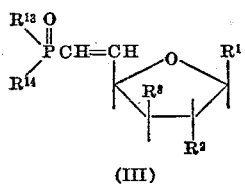
(III)
wherein $R^1$, $R^2$, $R^8$, $R^{13}$ and $R^{14}$ are as defined in claim 1.
References Cited
UNITED STATES PATENTS
3,583,974   6/1971   Jones et al. _____ 260—211.5 R
LEWIS GOTTS, Primary Examiner
J. R. BROWN, Assistant Examiner
U.S. Cl. X.R.
260—932, 999